United States Patent
Panchal

(10) Patent No.: US 12,470,952 B2
(45) Date of Patent: Nov. 11, 2025

(54) METHOD AND SYSTEM FOR MIMO SELECTION

(71) Applicant: Verizon Patent and Licensing Inc., Basking Ridge, NJ (US)

(72) Inventor: Jignesh S. Panchal, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 343 days.

(21) Appl. No.: 18/341,031

(22) Filed: Jun. 26, 2023

(65) Prior Publication Data

US 2024/0430706 A1 Dec. 26, 2024

(51) Int. Cl.
*H04W 24/02* (2009.01)
*H04B 7/0452* (2017.01)

(52) U.S. Cl.
CPC .......... *H04W 24/02* (2013.01); *H04B 7/0452* (2013.01)

(58) Field of Classification Search
CPC .............................. H04W 24/02; H04B 7/0452
See application file for complete search history.

(56) References Cited

U.S. PATENT DOCUMENTS

| | | | |
|---|---|---|---|
| 2013/0258886 A1* | 10/2013 | Chen | H04B 7/0452 370/252 |
| 2014/0112407 A1* | 4/2014 | Nammi | H04B 7/0639 375/267 |
| 2019/0058509 A1* | 2/2019 | Tomala | H04W 76/19 |
| 2022/0201556 A1* | 6/2022 | Yang | H04W 28/24 |

* cited by examiner

*Primary Examiner* — Walli Z Butt

(57) ABSTRACT

A method, a network device, and a non-transitory computer-readable storage medium are described in relation to an MIMO selection service. The MIMO selection service may include calculating MIMO configurations that include a number of layers for each MIMO configuration pertaining to a group of end devices; and identifying performance metric sensitive end devices of the group. The MIMO selection service may further include selecting for each performance metric sensitive end device, a first MIMO configuration from the MIMO configurations that has a higher number of layers relative to one or more other MIMO configurations of the MIMO configurations; and selecting for each non-performance metric sensitive end device of the group, a second MIMO configuration from the MIMO configurations that combined with the first MIMO configuration yield a highest spectral efficiency.

20 Claims, 5 Drawing Sheets

METHOD AND SYSTEM FOR MIMO SELECTION

BACKGROUND

Development and design of networks present certain challenges from a network-side perspective and an end device perspective. For example, Next Generation (NG) wireless networks, such as Fifth Generation New Radio (5G NR) networks are being deployed and are under development. End devices may connect to a radio access network according to various types of configurations.

DETAILED DESCRIPTION

Figure 1:
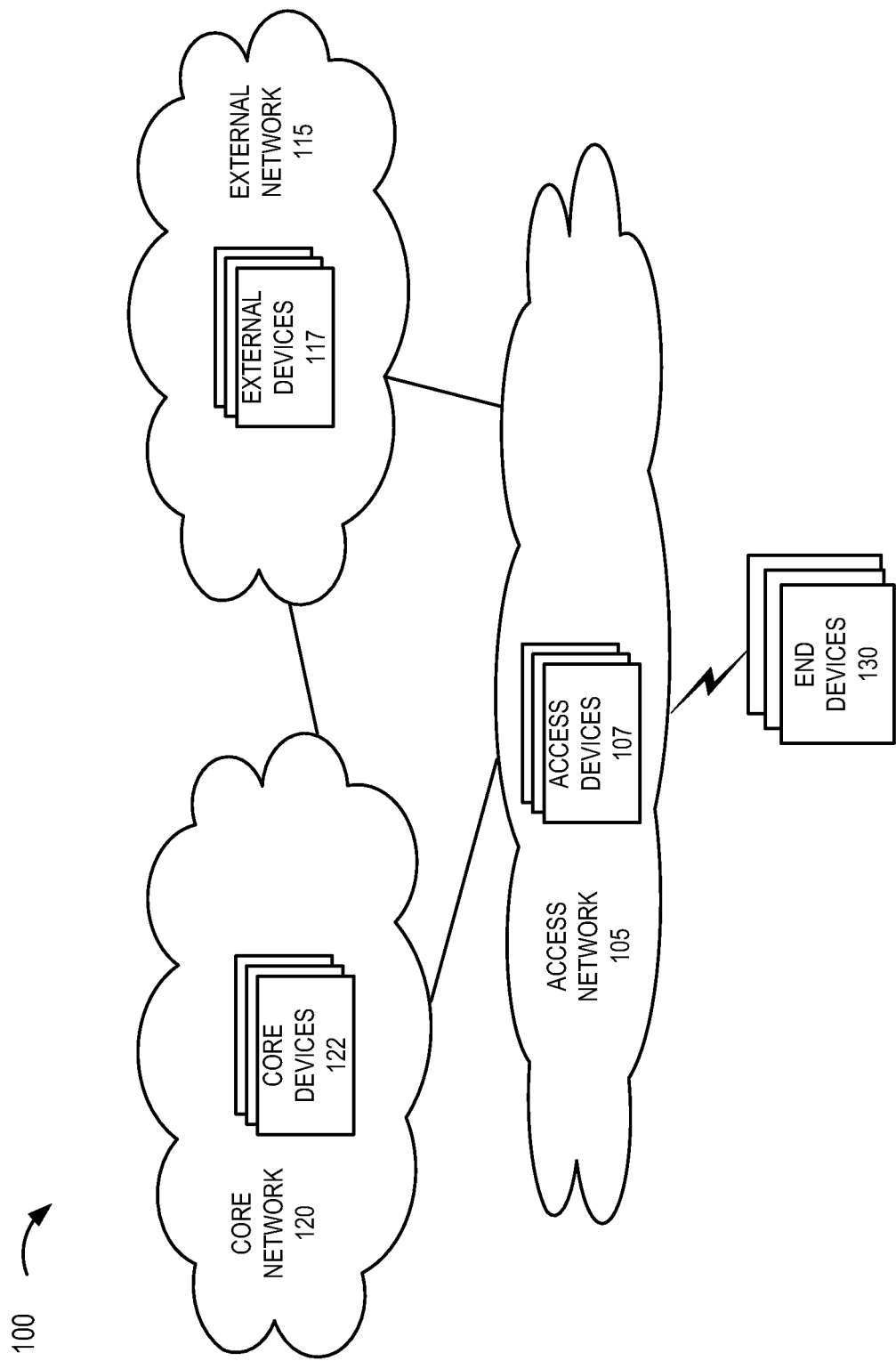
FIG. 1 is a diagram illustrating an exemplary environment in which an exemplary embodiment of a Multi-Input Multi-Output (MIMO) selection service may be implemented.

The following detailed description refers to the accompanying drawings. The same reference numbers in different drawings may identify the same or similar elements. Also, the following detailed description does not limit the invention.

Multi-Input Multi-Output (MIMO) technology supports two or more transmitters and receivers associated with a wireless device, which may enable the transmission and reception of wireless signals at the same time, for example. In 5G NR, massive MIMO facilitates the full potential for increasing network coverage, capacity, user throughput, spectral efficiency, among other things, while minimizing radio site densification. MIMO technology may be supported in both the uplink (UL) and the downlink (DL) transmissions.

Single-user MIMO (SU-MIMO) enables the transmission of one or multiple data streams (also called layers) from one transmitting array to a single user. The number of layers that may be supported (also called rank) may depend on the radio channel and the minimum number of antennas on each side. SU-MIMO may be achieved by sending different layers on different polarizations in the same direction or by sending different layers on different propagation paths (e.g., a multipath). In contrast, multi-user MIMO (MU-MIMO) enables the transmission of different layers in separate beams to different users using the same time and frequency resources.

With network slicing and expected proliferation of various types of use cases, latency or other types of performance metrics (e.g., throughput, reliability, etc.) may factor into the configuration of MIMO.

According to exemplary embodiments, a MIMO selection service is described herein. The MIMO selection service may be applied to a wireless environment. For example, the wireless environment may include a Fourth Generation (4G) wireless environment, a 5G wireless environment, a future generation wireless environment, or a non-cellular wireless environment, such as Wi-Fi or the like, as described herein.

According to an exemplary embodiment, a radio access network (RAN) device (e.g., an evolved Node B (eNB), a next generation Node B (gNB), a future generation wireless station, a wireless access point (WAP), a Wi-Fi device, an access device, or the like) that may have MIMO capabilities may include logic of an exemplary embodiment of the MIMO selection service. According to an exemplary embodiment, the MIMO selection service may be implemented for UL and/or DL transmissions, as described herein. According to an exemplary embodiment, the MIMO selection service may be applied to a cell, a sector, a sub-sector, zone, or carrier associated with the RAN device. For example, the sub-sector/zone level may include multiple divisions of a geographic area of a sector relative to the RAN device. By way of further example, the sector may be divided based on proximity to the antenna of the RAN device (e.g., near, mid, far) and/or another criterion. According to another example, radio coverage of a location may be divided based on a Military Grid Reference System (MGRS) or another type of grid system to produce geo-bins. The size and/or shape of each geo-bin may be configurable. The size and/or the shape of a geo-bin may depend on the type of the RAN device (e.g., eNB versus gNB, etc.), attributes of the RAN device (e.g., antenna configuration, radio frequency band of beam, etc.), and/or other factors (e.g., terrain of the radio covered locale). According to an exemplary embodiment, the MIMO selection service may be implemented for any radio frequency band, spectrum, carrier, or the like.

According to an exemplary embodiment, the MIMO selection service may include a binary choice selection between SU-MIMO and MU-MIMO. According to other exemplary embodiments, the MIMO selection service may include a higher number of choices (e.g., a ternary choice, a quaternary choice, or higher). For example, the available MIMO configurations may further include massive MIMO (M-MIMO), closed loop MIMO, open loop MIMO, or another type of beamforming configuration.

According to an exemplary embodiment, the MIMO selection service may select a type of MIMO from among multiple types of MIMO based on a performance criterion. For example, according to an exemplary embodiment, the MIMO selection service may include identifying an end device of a particular performance metric type. By way of example, the MIMO selection service may identify those end devices that may be latency sensitive, throughput sensitive, reliability sensitive, and/or another performance metric (e.g., packet error rate, maximum bit rate, etc.) based on a threshold performance metric value associated with the end device's user plane traffic, Quality of Service (QOS) flow, radio bearer, QoS value, application service, class of service (CoS), 5G QOS Identifier (5QI), QoS Class identifier (QCI) value, a network slice identifier (e.g., single network slice selection assistance information (S-NSSAI)), stream classification service (SCS), profile and/or subscription (e.g., service level agreement (SLA), tier of subscription, etc.), or the like.

According to an exemplary embodiment, based on the identification of the performance metric sensitive end device, the MIMO selection service may select the type of MIMO (e.g., SU-MIMO versus MU-MIMO) that provides the highest number of layers for the end device. For example, more MIMO layers typically yield better latency or other performance metric performance and higher spectral efficiency per user. According to an exemplary embodiment, the MIMO selection service may select the MIMO type based on a comparison of the number of MIMO layers associated with different MIMO types, as described herein. According to an exemplary embodiment, the MIMO selection service may select a MU-MIMO configuration for performance metric sensitive end devices according to an exemplary expression (1):

If and only if: $L^{SU} \leq L^{MU}$, L=number of MIMO layers;
Otherwise, select SU-MIMO.

According to another exemplary embodiment, the exemplary expression may be expressed as expression (2):

If and only if: $L^{SU} < L^{MU}$, L=number of MIMO layers;
Otherwise, select SU-MIMO.

According to an exemplary embodiment, for those end devices that may be identified or determined to be non-performance metric sensitive, the MIMO selection service may calculate and select a MIMO configuration that, in combination with the MIMO configurations for the performance metric sensitive end devices, will yield the optimal spectral efficiency. According to various exemplary embodiments, the optimal spectral efficiency may relate to a sector, a sub-sector, a cell, etc., in relation to the RAN device.

According to an exemplary embodiment, the MIMO selection service may calculate and select the MIMO configuration based on codebook information, reference signal information, and/or other types of information, as described herein. According to an exemplary embodiment, the MIMO selection service may include calculating multiple MIMO configurations for the end device and the corresponding number of layers. For example, the MIMO selection service may calculate both an SU-MIMO configuration and an MU-MIMO configuration for the end device as well as their corresponding number of layers. Based on the identification of a performance metric sensitive end device, the MIMO selection service may include re-calculating and re-pairing other non-performance metric sensitive end devices (e.g., of a MU-MIMO group) to a new MIMO configuration with the exclusion of the performance metric sensitive end device. The MIMO selection service may recalculate the number of layers for the MU-MIMO configuration. According to an exemplary embodiment, the MIMO selection service may be provided on a per time slot basis (e.g., transmission time interval (TTI)).

In view of the foregoing, the MIMO selection service may improve a performance metric of traffic from the end device perspective as well as optimizing spectral efficiency from the network perspective based on the assignment of the MIMO configuration and associated layers for DL and UL transmissions.

FIG. 1 is a diagram illustrating an exemplary environment 100 in which an exemplary embodiment of a MIMO selection service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), client/server, peer-to-peer, etc.) and/or implemented with various networking approaches (e.g., logical, virtualization, network slicing, etc.). The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the MIMO selection service may use at least one of these planes of communication.

Access network 105 may include one or multiple networks of one or multiple types and technologies. For example, access network 105 may be implemented to include a 5G RAN, a future generation RAN (e.g., a Sixth Generation (6G) RAN, a Seventh Generation (7G) RAN, or a subsequent generation RAN), a centralized-RAN (C-RAN), an Open-RAN (O-RAN), and/or another type of access network. Access network 105 may include a legacy RAN (e.g., a Third Generation (3G) RAN, a 4G or 4.5 RAN, etc.). Access network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, a virtualized RAN (vRAN), a self-organizing network (SON), a wired network (e.g., optical, cable, etc.), or another type of network that provides access to or can be used as an on-ramp to access network 105.

Access network 105 may include different and multiple functional splitting, such as options 1, 2, 3, 4, 5, 6, 7, or 8 that relate to combinations of access network 105 and core network 120 including an Evolved Packet Core (EPC) network and/or an NG core (NGC) network, or the splitting of the various layers (e.g., physical layer, media access control (MAC) layer, radio link control (RLC) layer, and packet data convergence protocol (PDCP) layer, etc.), plane splitting (e.g., user plane, control plane, etc.), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA) (e.g., intra-band, inter-band, contiguous, non-contiguous, etc.), edge and core network slicing, coordinated multipoint (COMP), various duplex schemes (e.g., frequency division duplex (FDD), time division duplex (TDD), half-duplex FDD (H-FDD), etc.), and/or another type of connectivity service (e.g., NSA new radio (NR), SA NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of wireless architecture. Additionally, according to various exemplary embodiments, access network 105 may be implemented according to various wireless technologies (e.g., RATs, etc.), and various wireless standards, frequencies, bands, and segments of radio spectrum (e.g., centimeter (cm) wave, millimeter (mm) wave, below 6 gigahertz (GHz), above 6 GHz, higher than mm wave, C-band, licensed radio spectrum, unlicensed radio spectrum, above mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a gNB, an enhanced Long Term Evolution (eLTE) eNB, an eNB, a radio network controller (RNC), a RAN intelligent controller (RIC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, a home gNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), or another type of wireless node (e.g., a WiFi device, a WiMax device, a hotspot device, a fixed wireless access CPE (FWA CPE), etc.) that provides a wireless access service. Additionally, access devices 107 may include a wired and/or an optical device (e.g., modem, wired access point, optical access point, Ethernet device, multiplexer, etc.) that provides network access and/or transport service.

According to some exemplary implementations, access device 107 may include a combined functionality of multiple radio access technologies (RATs) (e.g., 4G and 5G functionality, 5G and 5.5G functionality, etc.) via soft and hard bonding based on demands and needs. According to some exemplary implementations, access device 107 may include a split access device (e.g., a CU-control plane (CP), a CU-user plane (UP), etc.) or an integrated functionality, such as a CU-CP and a CU-UP, or other integrations of split RAN nodes. Access device 107 may be an indoor device or an outdoor device.

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), two dimensional (2D) beamforming, antenna spacing, tilt (relative to the ground), radiation pattern, directivity, elevation, planar arrays, and so forth. According to various exemplary embodiments, access device 107 may be capable of establishing a wireless or radio connection with end devices 130 via a cellular technology (e.g., 4G, 5G, Third Generation Partnership Project (3GPP), or the like) and/or via a non-cellular wireless technology (e.g., Wi-Fi, UWB, or the like).

According to an exemplary embodiment, at least some of access devices 107 may include logic of an exemplary embodiment of the MIMO selection service. For example, access device 107 may, for each slot or TTI pertaining to the DL and/or the UL, calculate a MIMO selection for each end device 130 of relevance based on reference signals (e.g., sounding reference signal (SRS), demodulation reference signal (DMRS), channel state information reference signal (CSI-RS), and/or the like) and/or codebook information (e.g., precoding matrix indicator (PMI), channel quality indicator (CQI), rank indicator (RI), and/or the like). Access device 107 may calculate and/or consider other values, factors, and/or criterion, such as power constraints, interference, the number of layers per end device 130, pairing of end devices for an MU-MIMO configuration, modulation scheme, and so forth. Access device 107 may tentatively assign end devices 130 to a MIMO configuration.

According to an exemplary embodiment, access device 107 may include identifying end device 130 that may be performance metric-sensitive, as described herein. According to an exemplary embodiment, based on the identification of end device 130, access device 107 may select the type of MIMO (e.g., SU-MIMO versus MU-MIMO) that provides the highest number of layers for end device 130. For example, access device 107 may select the MIMO type based on a comparison of the number of MIMO layers associated with different MIMO types, as described herein.

According to an exemplary embodiment, access device 107 may calculate the spectral efficiency or capacity of the SU-MIMO end devices 130 and the MU-MIMO end devices 130 for a given cell, sector, or sub-sector and slot or TTI. Based on the calculation, access device 107 service may determine whether to re-pair or re-assign a different MIMO configuration for one or more end devices 130 to achieve a maximum capacity.

External network 115 may include one or multiple networks of one or multiple types and technologies that provides an application service. For example, external network 115 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a MEC network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, a data network, or other type of application service layer network that may provide access to and may host an end device application service.

Depending on the implementation, external network 115 may include various network devices such as external devices 117. For example, external devices 117 may include virtual network devices (e.g., virtualized network functions (VNFs), servers, host devices, application functions (AFs), application servers (ASs), server capability servers (SCSs), containers, hypervisors, virtual machines (VMs), pods, network function virtualization infrastructure (NFVI), and/or other types of virtualization elements, layers, hardware resources, operating systems, engines, etc.) that may be associated with application services for use by end devices 130. By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). Although not illustrated, external network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, video calling, video conferencing, instant messaging), video streaming, fitness services, navigation services, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include non-virtual, logical, and/or physical network devices.

Core network 120 may include one or multiple networks of one or multiple network types and technologies. Core network 120 may include a complementary network of access network 105. For example, core network 120 may be implemented to include a 5G core network, an evolved packet core (EPC) of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF), a Non-3GPP Interworking Function (N3IWF), an access and mobility management function (AMF), a session management function (SMF), a unified data management (UDM) device, a unified data repository (UDR), an authentication server function (AUSF), a security anchor function (SEAF), a network slice selection function (NSSF), a network repository function (NRF), a policy control function (PCF), a network data analytics function (NWDAF), a network exposure function (NEF), a service capability exposure function (SCEF), a lifecycle management (LCM) device, a mobility management entity (MME), a packet data network gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

End device 130 may include a device that may have communication capabilities (e.g., wireless, wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device (e.g., a watch, glasses, headgear, a band, etc.), a computer, a gaming device, a television, a set top box, a music device, an IoT device, a drone, a smart device, a fixed wireless device, a router, a sensor, an automated guided vehicle (AGV), an industrial robot, or other type of wireless device (e.g., other type of user equipment (UE)). End device 130 may be configured to execute various types of software (e.g., applications, programs, etc.). The number and the types of software may vary among end devices 130. End device 130 may include "edge-aware" and/or "edge-unaware" application service clients. For purposes of description, end device 130 is not considered a network device. End device 130 may be implemented as a virtualized device in whole or in part.

According to an exemplary embodiment, at least some of end devices 130 include logic that support a MIMO configuration. For example, these end devices 130 may support SU-MIMO, MU-MIMO, and/or another type of beamforming, transmission and reception techniques using multiple antennas or the like.

Figure 2:
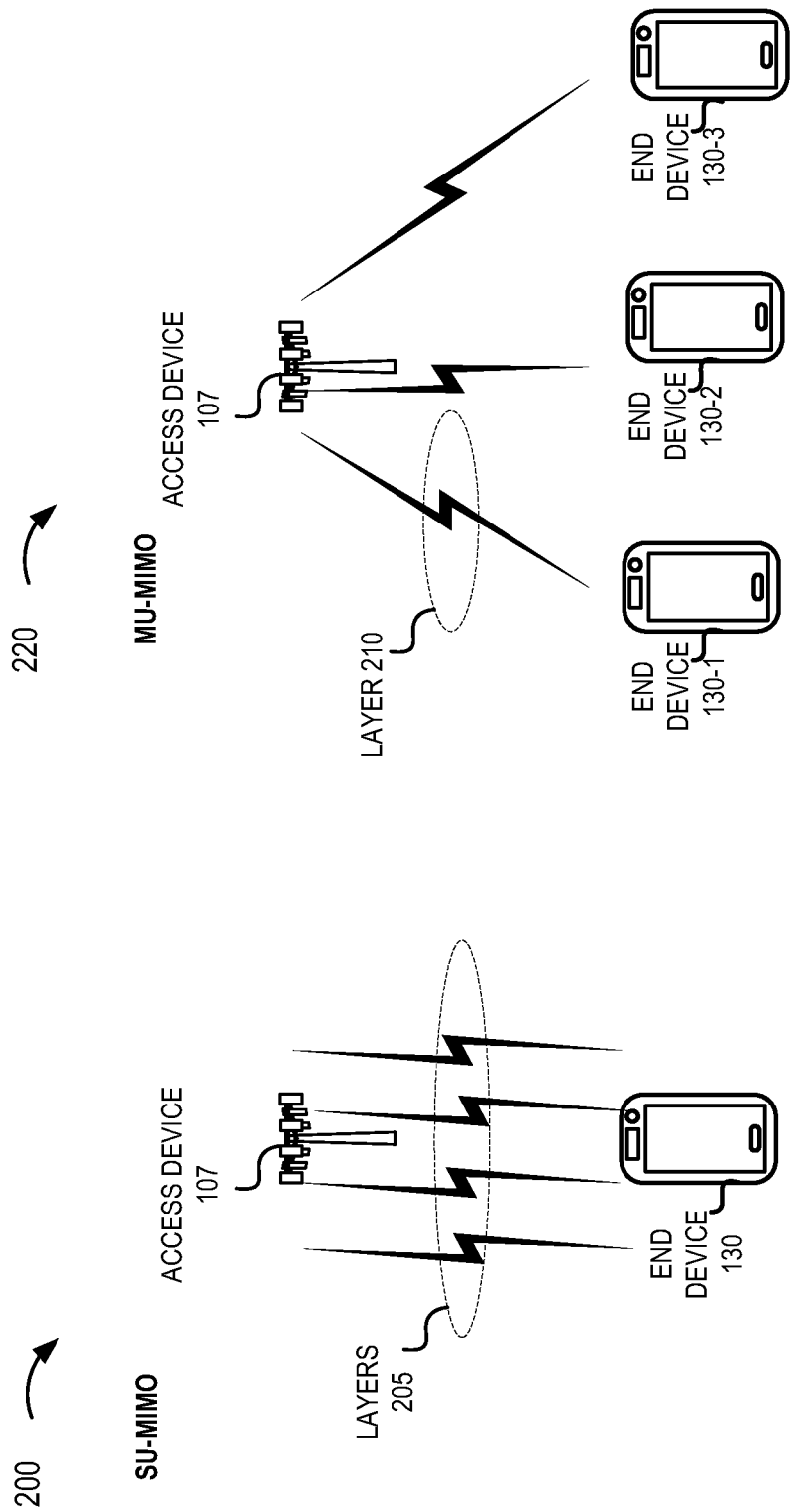
FIG. 2A is a diagram illustrating an exemplary single user (SU)-MIMO configuration.
FIG. 2B is a diagram illustrating an exemplary multiple user (MU)-MIMO configuration.

FIGS. 2A and 2B are diagrams illustrating an exemplary SU-MIMO configuration 200 and an exemplary MU-MIMO configuration 220, respectively. As illustrated, an exemplary environment may include end device 130 and access device 107, which have been described herein. Referring to FIG. 2A, SU-MIMO configuration 200 may include layers 205, such as 4 layers or streams of data, to (a single) end device 130. The number of layers 205 is purely exemplary. Referring to FIG. 2B, MU-MIMO configuration 220 may include layer 210, such as a single layer of streams of data, to each end device 130 of multiple end devices 130-1 through 130-3.

Figure 3:
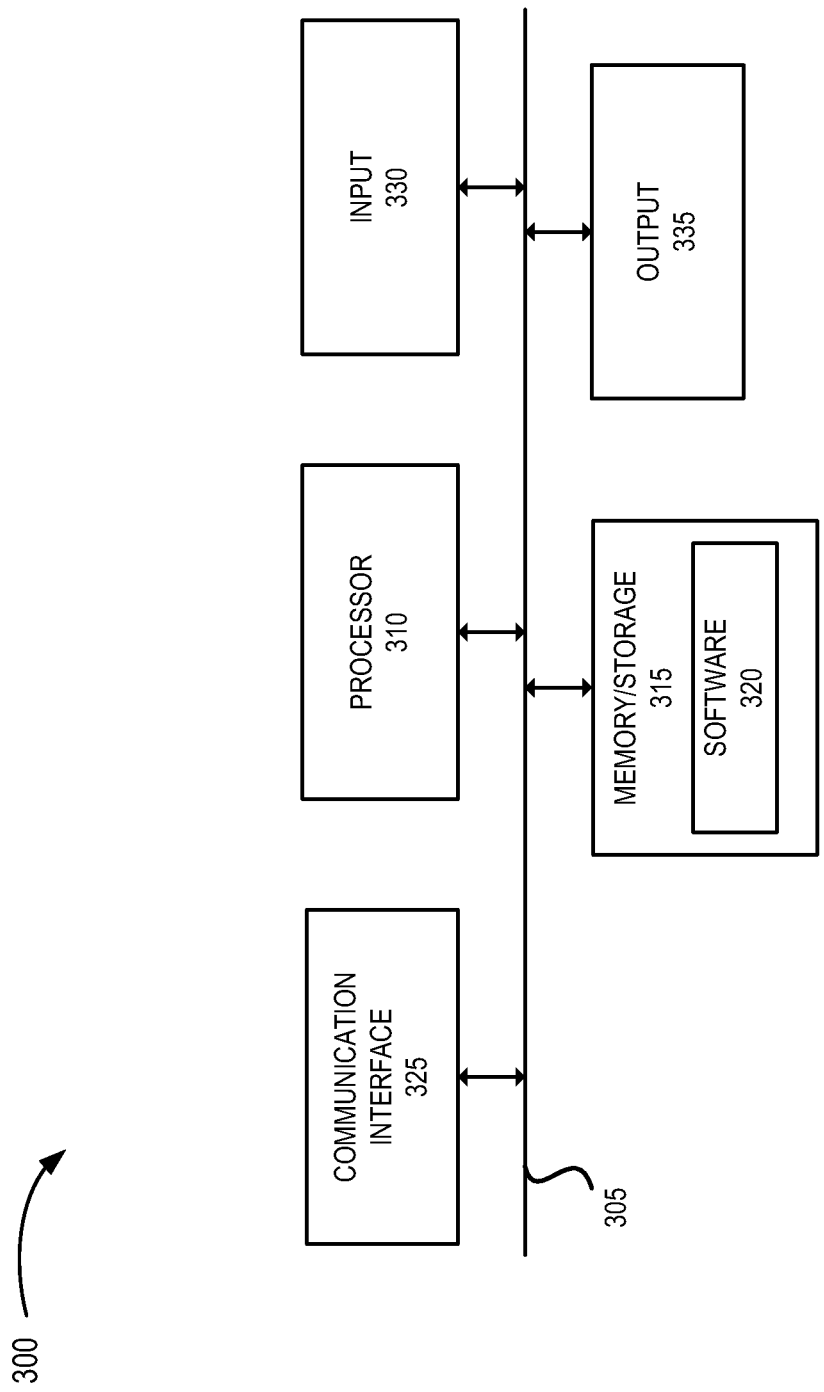
FIG. 3 is a diagram illustrating exemplary components of a device that may correspond to one or more of the devices illustrated and described herein.

FIG. 3 is a diagram illustrating exemplary components of a device 300 that may be included in one or more of the devices described herein. For example, device 300 may correspond to access device 107, external device 117, core device 122, end device 130, and/or other types of devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 315 may be external to and/or removable from device 300, such as, for example, a Universal Serial Bus (USB) memory stick, a dongle, a hard disk, mass storage, off-line storage, or some other type of storing medium. Memory/storage 315 may store data, software, and/or instructions related to the operation of device 300.

Software 320 includes an application or a program that provides a function and/or a process. As an example, with reference to access device 107, software 320 may include an application that, when executed by processor 310, provides a function and/or a process of the MIMO selection service, as described herein. Software 320 may also include firmware, middleware, microcode, hardware description language (HDL), and/or another form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces, optical interfaces, and/or wired interfaces. For example, communication interface 325 may include one or multiple transmitters and receivers, or transceivers. Communication interface 325 may operate according to a protocol stack and a communication standard. Communication interface 325 may support one or multiple MIMO, beamforming, and/or transmission/reception configurations.

Input 330 permits an input into device 300. For example, input 330 may include a keyboard, a mouse, a display, a touchscreen, a touchless screen, a button, a switch, an input port, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 300 may be implemented in the same manner. For example, device 300 may be instantiated, created, deleted, or some other operational state during its life-cycle (e.g., refreshed, paused, suspended, rebooted, or another type of state or status), using well-known virtualization technologies. For example, access device 107, core device 122, external device 117, and/or another type of network device or end device 130, as described herein, may be a virtualized device.

Device 300 may be configured to perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a function or a process described herein. Alternatively, for example, according to other implementations, device 300 may be configured to perform a function or a process described herein based on the execution of hardware (processor 310, etc.).

Figure 4:
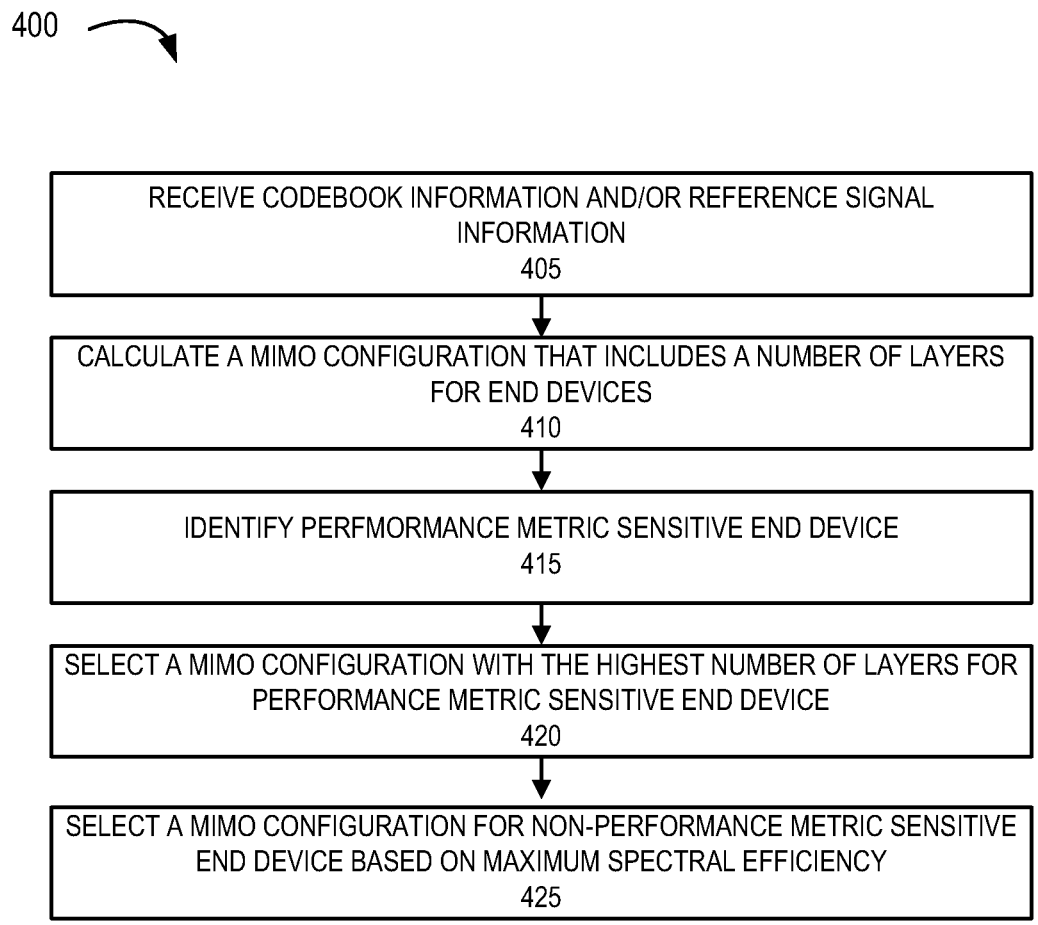
FIG. 4 is a flow diagram illustrating an exemplary process of an exemplary embodiment of the MIMO selection service.

FIG. 4 is a flow diagram illustrating an exemplary process 400 of an exemplary embodiment of the MIMO selection service. According to an exemplary embodiment, access device 107 may perform process 400. As described herein, access device 107 may be implemented as a cellular wireless device (e.g., eNB, eLTE eNB, gNB, or the like) or a non-cellular wireless device (e.g., a Wi-Fi device, a UWB device, etc.). According to an exemplary implementation, processor 310 executes software 320 to perform a step (in whole or in part) of process 400, as described herein. Alternatively, a step (in whole or in part) may be performed by execution of only hardware.

According to an exemplary embodiment, process 400 is described in relation to a binary choice selection between SU-MIMO and MU-MIMO. According to other exemplary embodiments, process 400 may include a higher number of choices (e.g., a ternary choice, a quaternary choice, or higher). For example, the available MIMO configurations may further include massive MIMO (M-MIMO), closed loop MIMO, open loop MIMO, or another type of beamforming configuration.

Referring to FIG. 4, in block 405, access device 107 may receive codebook information and/or reference signal information. For example, access device 107 may receive codebook information and/or reference signal information from end device 130 and/or calculate information, based on reference signals (e.g., SRS, DMRS, CSI-RS), and/or the like), codebook information (e.g., PMI, CQI, RI, and/or the like), and other values, factors, and/or criterion, such as power constraints, interference, the number of layers per end device 130, pairing of end devices for an MU-MIMO configuration, modulation scheme, and so forth.

In block 410, access device 107 may calculate a MIMO configuration, which includes a number of layers, for end devices 130. For example, access device 107 may calculate the MIMO configuration based on the codebook, reference signal, and/or other information for a slot or a TTI. According to some exemplary embodiments, access device 107 may calculate multiple MIMO configurations for each end device 130 or a portion of end devices 130. By way of example, access device 107 may calculate an SU-MIMO configuration and determined number of layers, as well as an MU-MIMO configuration and a determined number of layers for end device 130.

In block 415, access device 107 may identify performance metric sensitive end device 130. For example, access device 107 may identify end device 130 that is latency sensitive, throughput sensitive, reliability sensitive, and/or another performance metric (e.g., packet error rate, maximum bit rate, etc.) based on a threshold performance metric value associated with the end device 130's user plane traffic, QoS flow, a radio bearer, a QoS value, application service, CoS, 5QI, QCI value, a network slice identifier, SCS, profile and/or subscription, or the like.

In block 420, access device 107 may select a MIMO configuration with the highest number of layers for performance metric sensitive end device 130. For example, according to an exemplary implementation, access device 107 may select a MU-MIMO configuration for performance metric sensitive end device 130 according to an exemplary expression:

If and only if: $L^{SU} \leq L^{MU}$, L=number of MIMO layers;
Otherwise, select SU-MIMO.

According to other exemplary implementations, access device 107 may use expression (2), as described herein.

In block 425, access device 107 may select a MIMO configuration for non-performance metric sensitive end device 130 based on a maximum spectral efficiency. Access device 107 may identify a non-performance metric sensitive end device 130 based on those end devices 130 that may not satisfy the threshold or minimum performance metric value, as described herein, in relation to one or more types of performance metrics (e.g., latency, reliability, etc.). Access device 130 may use the MIMO configuration calculated in block 410 relating to non-performance metric sensitive end device 130 to further select the MIMO configuration (e.g., SU-MIMO or MU-MIMO) that, in combination with the MIMO configurations for the performance metric sensitive end devices 130, that will yield the optimal spectral efficiency. For example, depending on a spectral efficiency calculation, some non-performance metric sensitive end devices 130 may be assigned one type of MIMO configuration (e.g., SU-MIMO configuration) while other non-performance metric sensitive end devices 130 may be assigned another type of MIMO configuration (e.g., MU-MIMO configuration). According to other examples, non-performance metric sensitive end device 130 may be assigned the same type of MIMO configuration. According to various exemplary embodiments, the optimal spectral efficiency may relate to a sector, a sub-sector, a cell, etc., in relation to access device 107.

FIG. 4 illustrates an exemplary process of the MIMO selection service, however, according to other exemplary embodiments, the MIMO selection service may perform additional operations, fewer operations, and/or different operations than those illustrated and described. For example, access device 107 may schedule the slot or TTI pertaining to a prospective transmission or a prospective reception of data in an UL or a DL in accordance with the selected MIMO configuration and corresponding end device (e.g., performance metric sensitive end device 130, non-performance metric sensitive end device 130). Access device 107 may subsequently transmit to or receive data from end device 130 based on the schedule.

Figure 5:
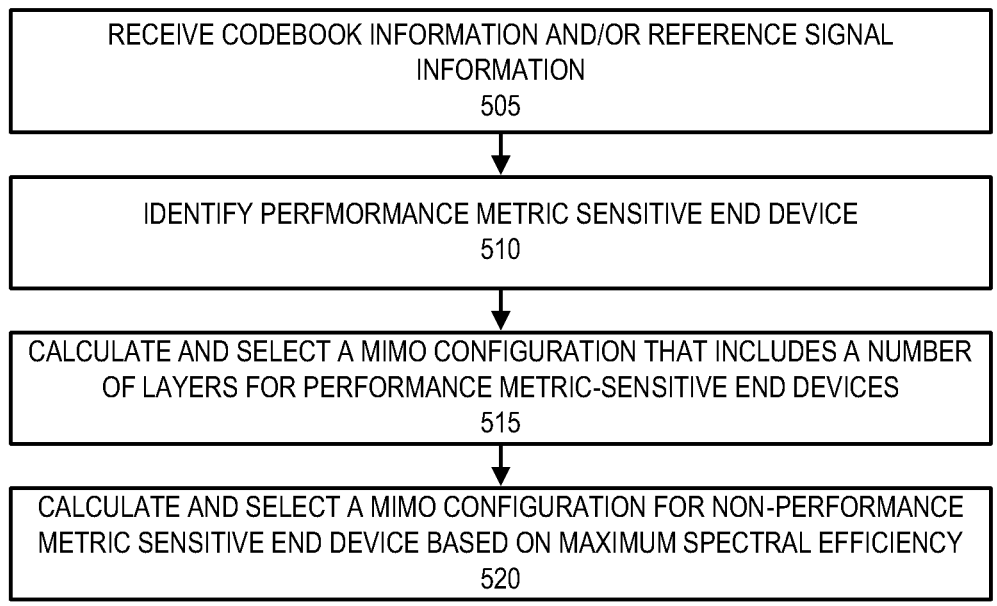
FIG. 5 is a flow diagram illustrating another exemplary process of an exemplary embodiment of the MIMO selection service.

FIG. 5 is a flow diagram illustrating an exemplary process 500 of an exemplary embodiment of the MIMO selection service. According to an exemplary embodiment, access device 107 may perform process 500. As described herein, access device 107 may be implemented as a cellular wireless device (e.g., eNB, eLTE eNB, gNB, or the like) or a non-cellular wireless device (e.g., a Wi-Fi device, a UWB device, etc.). According to an exemplary implementation, processor 310 executes software 320 to perform a step (in whole or in part) of process 500, as described herein. Alternatively, a step (in whole or in part) may be performed by execution of only hardware.

According to an exemplary embodiment, process 500 is described in relation to a binary choice selection between SU-MIMO and MU-MIMO. According to other exemplary embodiments, process 500 may include a higher number of choices (e.g., a ternary choice, a quaternary choice, or higher). For example, the available MIMO configurations may further include massive MIMO (M-MIMO), closed loop MIMO, open loop MIMO, or another type of beamforming configuration.

Referring to FIG. 5, in block 505, access device 107 may receive codebook information and/or reference signal information. For example, access device 107 may receive codebook information and/or reference signal information from end device 130 and/or calculate information, based on reference signals (e.g., SRS, DMRS, CSI-RS), and/or the like), codebook information (e.g., PMI, CQI, RI, and/or the like), and other values, factors, and/or criterion, such as power constraints, interference, the number of layers per end device 130, pairing of end devices for an MU-MIMO configuration, modulation scheme, and so forth.

In block 510, access device 107 may identify a performance metric sensitive end device 130. For example, access device 107 may identify end device 130 that is latency sensitive, throughput sensitive, reliability sensitive, and/or another performance metric (e.g., packet error rate, maximum bit rate, etc.) based on a threshold performance metric value associated with the end device 130's user plane traffic, QoS flow, a radio bearer, a QoS value, application service, CoS, 5QI, QCI value, a network slice identifier, SCS, profile and/or subscription, or the like.

In block 515, access device 107 may calculate and select a MIMO configuration, which includes a number of layers, for performance sensitive end devices 130. For example, access device 107 may calculate the MIMO configuration based on the codebook, reference signal, and/or other information for a slot or a TTI. Access device 107 may select a MIMO configuration with the highest number of layers for performance metric sensitive end device 130. For example, according to an exemplary implementation, access device 107 may select a MU-MIMO configuration for performance metric sensitive end device 130 according to an exemplary expression:

If and only if: $L^{SU} \leq L^{MU}$, L=number of MIMO layers;
Otherwise, select SU-MIMO.

According to other exemplary implementations, access device 107 may use expression (2), as described herein.

In block 520, access device 107 may calculate and select a MIMO configuration for non-performance metric sensitive end devices 130. Access device 107 may identify a non-performance sensitive end device 130 based on those end devices 130 that may not satisfy the threshold or minimum performance metric value, as described herein, in relation to one or more performance metrics. Access device 107 may calculate the MIMO configuration based on the codebook, reference signal, and/or other information for a slot or a TTI. Access device 107 may select the MIMO configuration for non-performance metric sensitive end device 130 based on a maximum spectral efficiency. For example, access device 130 may select the MIMO configuration that, in combination with the MIMO configurations for the performance metric sensitive end devices 130, will yield the optimal spectral efficiency. For example, depending on a spectral efficiency calculation, some non-performance metric sensitive end devices 130 may be assigned one type of MIMO configuration (e.g., SU-MIMO configuration) while other non-performance metric sensitive end devices 130 may be assigned another type of MIMO configuration (e.g., MU-MIMO configuration). According to other examples, non-performance metric sensitive end device 130 may be assigned the same type of MIMO configuration. According to various exemplary embodiments, the optimal spectral efficiency may relate to a sector, a sub-sector, a cell, etc., in relation to access device 107.

FIG. 5 illustrates an exemplary process of the MIMO selection service, however, according to other exemplary embodiments, the MIMO selection service may perform additional operations, fewer operations, and/or different operations than those illustrated and described. For example, access device 107 may schedule the slot or TTI pertaining to a prospective transmission or a prospective reception of data in an UL or a DL in accordance with the selected MIMO configuration and corresponding end device (e.g., performance metric sensitive end device 130, non-performance metric sensitive end device 130). Access device 107 may subsequently transmit to or receive data from end device 130 based on the schedule.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described regarding the processes illustrated in FIGS. 4 and 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to the consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   calculating, by a radio access device, multiple-input multiple-output (MIMO) configurations that include a number of layers for each MIMO configuration pertaining to a group of end devices;
   identifying, by the radio access device, performance metric sensitive end devices of the group;
   selecting, by the radio access device for each performance metric sensitive end device, a first MIMO configuration from the MIMO configurations that has a higher number of layers relative to one or more other MIMO configurations of the MIMO configurations; and
   selecting, by the radio access device for each non-performance metric sensitive end device of the group, a second MIMO configuration from the MIMO configurations that combined with the first MIMO configuration yield a highest spectral efficiency.

2. The method of claim 1, further comprising:
   receiving, by the radio access device, at least one of codebook information or reference signal information pertaining to the group of end devices.

3. The method of claim 1, wherein the MIMO configurations include a single user MIMO (SU-MIMO) configuration and a multi-user MIMO (MU-MIMO) configuration.

4. The method of claim 1, further comprising:
   scheduling, by the radio access device with the group, a slot or a transmission time interval based on the first MIMO configuration and the second MIMO configuration.

5. The method of claim 1, wherein the identifying comprises:
   identifying, by the radio access device, the performance metric sensitive end devices based on a value pertaining to their user plane traffic.

6. The method of claim 1, wherein the performance metric sensitive end devices relate to at least one of latency, throughput, or reliability.

7. The method of claim 1, wherein the first MIMO configuration and the second MIMO configuration pertain to at least one of a prospective transmission or a prospective reception of user plane data.

8. The method of claim 1, wherein the radio access device is a next generation Node B (gNB), an evolved Node B (eNB), an enhanced Long Term Evolution (eLTE) eNB, or a non-cellular wireless access device.

9. A network device comprising:
   a processor that is configured to:
      calculate multiple-input multiple-output (MIMO) configurations that include a number of layers for each MIMO configuration pertaining to a group of end devices, wherein the network device is a radio access device;
      identify performance metric sensitive end devices of the group;
      select, for each performance metric sensitive end device, a first MIMO configuration from the MIMO configurations that has a higher number of layers relative to one or more other MIMO configurations of the MIMO configurations; and
      select, for each non-performance metric sensitive end device of the group, a second MIMO configuration from the MIMO configurations that combined with the first MIMO configuration yield a highest spectral efficiency.

10. The network device of claim 9, wherein the processor is further configured to:
    receive, at least one of codebook information or reference signal information pertaining to the group of end devices.

11. The network device of claim 9, wherein the MIMO configurations include a single user MIMO (SU-MIMO) configuration and a multi-user MIMO (MU-MIMO) configuration.

12. The network device of claim 9, wherein the processor is further configured to:
    schedule, with the group, a slot or a transmission time interval based on the first MIMO configuration and the second MIMO configuration.

13. The network device of claim 9, wherein when identifying, the processor is further configured to:
    identify the performance metric sensitive end devices based on a value pertaining to their user plane traffic.

14. The network device of claim 9, wherein the performance metric sensitive end devices relate to at least one of latency, throughput, or reliability.

15. The network device of claim 9, wherein the first MIMO configuration and the second MIMO configuration pertain to at least one of a prospective transmission or a prospective reception of user plane data.

16. The network device of claim 9, wherein the radio access device is a next generation Node B (gNB), an evolved Node B (eNB), an enhanced Long Term Evolution (eLTE) eNB, or a non-cellular wireless access device.

17. A non-transitory computer-readable storage medium storing instructions executable by a processor of a radio access device, wherein the instructions are configured to:
calculate multiple-input multiple-output (MIMO) configurations that include a number of layers for each MIMO configuration pertaining to a group of end devices;
identify performance metric sensitive end devices of the group;
select, for each performance metric sensitive end device, a first MIMO configuration from the MIMO configurations that has a higher number of layers relative to one or more other MIMO configurations of the MIMO configurations; and
select, for each non-performance metric sensitive end device of the group, a second MIMO configuration from the MIMO configurations that combined with the first MIMO configuration yield a highest spectral efficiency.

18. The non-transitory computer-readable storage medium of claim 17, wherein the instructions are further configured to:
schedule, with the group, a slot or a transmission time interval based on the first MIMO configuration and the second MIMO configuration.

19. The non-transitory computer-readable storage medium of claim 17, wherein the MIMO configurations include a single user MIMO (SU-MIMO) configuration and a multi-user MIMO (MU-MIMO) configuration.

20. The non-transitory computer-readable storage medium of claim 17, wherein the radio access device is a next generation Node B (gNB), an evolved Node B (eNB), an enhanced Long Term Evolution (eLTE) eNB, or a non-cellular wireless access device.

\* \* \* \* \*